United States Patent [19]
de la Rosa et al.

[11] Patent Number: 4,927,512
[45] Date of Patent: May 22, 1990

[54] PROCESS FOR PRODUCTION OF HYDROGEN PEROXIDE BY A CHEMICAL PHOTOREDUCTION OF OXYGEN, AND HYDROGEN PEROXIDE OBTAINED BY THIS PROCESS

[75] Inventors: Francisco F. de la Rosa; Jose A. Navarro; Mercedes Roncel; Miguel A. de la Rosa, all of Sevilla, Spain

[73] Assignee: Interox (Société Anonyme), Brussels, Belgium

[21] Appl. No.: 190,552

[22] Filed: May 5, 1988

[30] Foreign Application Priority Data

May 5, 1987 [ES] Spain .................................. 8701334

[51] Int. Cl.$^5$ ............................................. B01J 19/08
[52] U.S. Cl. ..................................................... 204/157.5
[58] Field of Search ...................................... 204/157.5

[56] References Cited

U.S. PATENT DOCUMENTS 1,659,382  2/1928  Taylor .............................. 204/157.5
4,576,687  3/1986  Hertl et al. ........................ 204/157.5

OTHER PUBLICATIONS

Photobiochemistry and Photobiophysics, 2 (1981) 355-364.
Photobiochemistry and Photobiophysics, 5 (1983) 93-103.
Chemical Abstracts, 29277e, vol. 108, No. 4, p. 499 (1987).
Chemical Abstracts, 182531c, vol. 98, No. 22, p. 175 (1983).
Jose A. Navarro et al., Journal of Photochemistry and Photobiology, "Hydrogen Peroxide Photoproduction by the Semicarbazide-tris(2,2'-Bipyridine)Ruthenium-(II)-Oxygen System", vol. 40, pp. 279-293 (1987).

*Primary Examiner*—John Doll
*Assistant Examiner*—Wayne A. Langel
*Attorney, Agent, or Firm*—Spencer & Frank

[57] ABSTRACT

Process for the manufacture of hydrogen peroxide by photoreduction of molecular oxygen in an aqueous medium in the presence of visible light, of semicarbazide acting as an electron donor and of a photosensitizer selected from among Bengal Rose and the rutheniumII tris(2,2'-dipyridyl) complex, the pH of the reaction medium being kept at a value above 9.

8 Claims, 3 Drawing Sheets

PROCESS FOR PRODUCTION OF HYDROGEN PEROXIDE BY A CHEMICAL PHOTOREDUCTION OF OXYGEN, AND HYDROGEN PEROXIDE OBTAINED BY THIS PROCESS

FIELD OF THE INVENTION

The present invention relates to a process for the production of hydrogen peroxide by photochemical catalysis of the reduction of molecular oxygen in an aqueous medium by means of a reducing agent.

TECHNOLOGY REVIEW

Hydrogen peroxide has already been produced by reduction of molecular oxygen by means of semicarbazide in an aqueous medium and in the presence of visible light and a photochemical catalyst (photosensitizer) belonging to the class of the flavins (PHOTOBIOCHEMISTRY AND PHOTOBIOPHYSICS, 1983, Amsterdam, M.A. DE LA ROSA, J. A. Navarro, F. F. DE LA ROSA and M. LOSADA "Stabilization by high pH of hydrogen peroxide production with flavin photosystems" pages 93 to 103, *pages 101 and 102*).

However, the use of flavins as photosensitizers has the disadvantage that they are rapidly destroyed by light unless the pH of the medium is carefully regulated to avoid the range of between 10 and 12 (*page 97*).

SUMMARY OF THE INVENTION

The invention remedies this disadvantage of the known process by providing a novel process for production of hydrogen peroxide by photochemical catalysis of the reduction of molecular oxygen in an aqueous medium by means of semicarbazide as the reducing agent, wherein the photosensitizer does not undergo major photochemical degradation before the reducing agent has been completely consumed in an alkaline medium.

To this effect, the invention relates to a process for the manufacture of hydrogen peroxide by photoreduction of molecular oxygen in an aqueous medium in the presence of visible light, of semicarbazide acting as an electron donor, and of a photosensitizer, according to which the photosensitizer is selected from among Bengal Rose and the rutheniumII tris(2,2'-dipyridyl) complex and the pH of the reaction medium is kept at a value above 9.

DETAILED DESCRIPTION OF THE INVENTION

Figure 1:
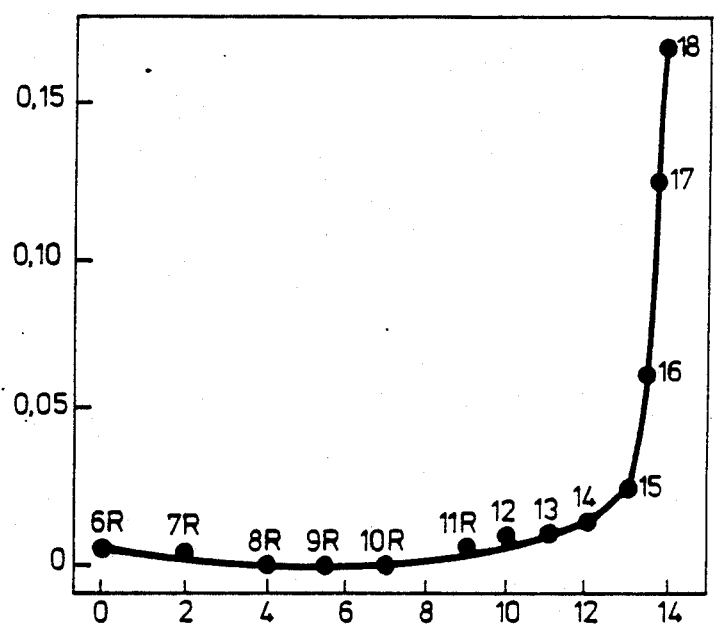
FIG. 1 illustrates the rate of formation of hydrogen peroxide in mmoles. liter$^{-1}$. min$^{-1}$ as a function of pH.

The term photoreduction is intended to denote an oxidation-reduction reaction which, to proceed, requires an input of energy in the form of photons (light energy).

The molecular oxygen employed as an oxidizing agent (electron acceptor) is oxygen in the gaseous state, as it exists under normal temperature and pressure conditions. Pure oxygen or a mixture with other inert gases may be used. By inert gases there are to be understood gases which interfere neither with the mechanism of the photochemical reaction as such nor with the stability of the hydrogen peroxide produced. An example of a very suitable mixture is air devoid of carbon dioxide. However, pure oxygen is preferred.

Molecular oxygen can be introduced into the reaction medium by any technique known per se which allows a gas to be dispersed in a liquid. For example, it is possible to pass a stream of oxygen gas through the liquid reaction medium, especially by bubbling-through of bubbles of pure oxygen by means of tubes which distribute the gas and which are dipped into the reaction medium.

The visible light employed is monochromatic or polychromatic radiation, the frequency or range of wavelengths of which is within, or coincides with, the spectral range which is visible to the human eye (400 to 800 nm). However, this radiation can contain radiation located in the infrared or ultraviolet, provided this nonvisible radiation constitutes less than 50% of the total amount of light energy utilized.

Examples of such light are natural sunlight such as reaches us across the earth's atmosphere and light emitted by various sources such as lasers, tubes in which an electric discharge takes place in a gas, usually referred to as fluorescent tubes, incandescent metallic filament lamps, halogen lamps, metal vapour lamps such as sodium vapour lamps, and light arcs produced by vaporization of metallic elements and combustion of inflammable or incandescent materials.

Semicarbazide is a reducing agent which serves to donate one or more electrons in an oxidation-reduction reaction.

It corresponds to the following chemical formula:

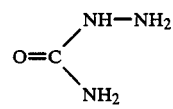

The semicarbazide is employed in the reaction medium in such concentrations that solutions of strength between 2 and 50 mM are obtained. Most commonly, the strength of the solutions is chosen within the limits of 5 to 30 mM.

The term photosensitizer denotes a photochemical catalyst, that is to say a product capable of absorbing light energy to reach an excited unstable state capable of overcoming the energy barrier in a chemical reaction which is difficult to catalyse purely thermally. Photosensitizers are generally dyestuffs or products containing chromophore groups.

According to the invention, the photosensitizer is chosen from among Bengal Rose and the rutheniumII tris(2,2'-dipyridyl) complex. Bengal Rose is a dyestuff derived from fluorescein, which is a sodium salt of 4,5,6,7-tetrachloro-2',4',5',7'-tetraiodofluorescein. The rutheniumII tris(2,2'-dipyridyl) complex, which hereinafter will be referred to by the abbreviation Ru(bpy)$_3^{2+}$, is the trichelate complex of the metal cation Ru$^{++}$ with the ligand 2,2'-dipyridyl, of formula

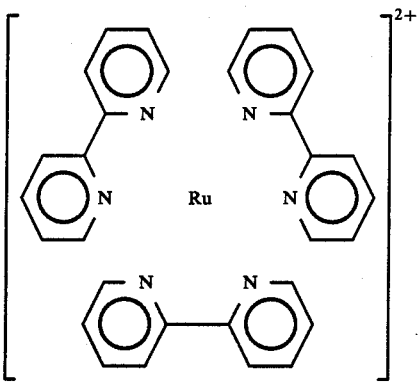

The amounts of photosensitizer employed are generally between 2 and 50 μmoles/liter. Amounts of between 4 and 30 μmoles/liter are very suitable.

According to the invention, the pH of the reaction medium is kept at an alkaline value above 9. Advantageously, the pH is fixed within the range of 10 to 14 and preferably at a value of between 12 and 14. To do this, a controlled quantity of an alkaline agent which does not interfere with the mechanism of the photochemical reaction is incorporated in the reaction medium. An example of a very suitable alkaline agent is sodium hydroxide in aqueous solution. The replenishment with alkaline agent must be continued during the progress of the reaction so as to maintain the pH of the reaction medium at the chosen value.

In the variant of the invention which employs Ru(bpy)$^{2+}$ as the photosensitizer, the following mechanism has been shown to apply:

$$Ru(bpy)_3^{2+} \xrightarrow{h\nu} {}^*Ru(bpy)_3^{2+} \quad (1)$$

$$^*Ru(bpy)_3^{2+} + O_2 \longrightarrow Ru(bpy)_3^{3+} + O_2^-. \quad (2)$$

$$2O_2^-. + H^+ \longrightarrow HO_2^- \quad (3)$$

$$SC + Ru(bpy)_3^{3+} \longrightarrow SC_{oxide} + Ru(bpy)_3^{2+}$$

where
h$\nu$ symbolizes the input of light energy,
*Ru(bpy)$_3^{2+}$ represents the RuII tris(2,2'-dipyridyl) complex in its photoexcited state,
O$_2^-$ represents the peroxide anion and
SC symbolizes semicarbazide.

This mechanism is based on the phenomenon of rapid quenching of the short-lived photoexcited complex by molecular oxygen (reaction (2)). This quenching reaction is, in the present case, of the oxidizing quenching type, where assistance is provided to a redox transfer of an electron from the photoexcited complex *Ru(bpy)$_3^{2+}$ to the oxygen molecule, which becomes reduced to a peroxide radical while the photoexcited complex oxidizes and passes into the higher oxidation state. In aqueous solution, the singlet oxygen anion gives rise to hydrogen peroxide (reaction (3)). Finally, the semicarbazide participates in a second redox reaction (reaction (4)) so as to reduce the Ru(bpy)$_3^{3+}$ complex to its lower state by donation of an electron, thereby regenerating the photosensitizing catalyst Ru(bpy)$_3^{2+}$ which can then participate in a fresh cycle.

Advantageously, the Ru(bpy)$_3^{2+}$ complex can be immobilized in an ion exchange polymer matrix so as to restrict the photodegradation of the ruthenium complex as much as possible. Very suitable ion exchange polymer resins are, for example, the resins belonging to the class of the perfluorosulphonates, especially those known under the trade mark NAFION (Du Pont).

In the other embodiment of the invention, which uses Bengal Rose as the photosensitizer, it is generally advantageous to employ a concentration of Bengal Rose close to a saturation value beyond which the degree of production of hydrogen peroxide no longer increases. More especially, it is preferred to use a Bengal Rose concentration of between 6 and 10 μmoles/liter.

In order to restrict the photodegradation of the Bengal Rose it is of value to select the visible light from among monochromatic or polychromatic light of wavelengths between 500 and 550 nm. For example, it is possible, with advantage, to use a green filter whose transmission is close to 100% in the wavelength range of from 500 to 550 nm.

It is also advantageous, for preserving the stability of the Bengal Rose, to restrict the light intensity to a photon flux density having a value less than a so-called saturation value beyond which the degree of production of hydrogen peroxide no longer increases. In the abovementioned green light range, this saturation value is approximately at 500 μE.m$^{-2}$.s$^{-1}$. The unit E employed here denotes the Einstein, that is to say N photons at a given wavelength, N being the Avogadro number. Preferably, the photon flux density is kept at between 100 and 500 μE.m$^{-2}$.s$^{-1}$.

The invention also relates, by way of an industrial product, to the aqueous hydrogen peroxide solution obtained by the photochemical process according to the invention.

The invention constitutes an interesting application of the conversion of solar light energy into chemical energy.

The examples which follow illustrate the invention without implying a limitation and refer to the attached drawings which are three diagrams showing the initial rate of production of hydrogen peroxide as a function of working parameters.

EXAMPLE 1 (according to the invention)

50 ml of a solution which is 20 mM in respect of semicarbazide, 0.1 mM in respect of Ru(bpy)$_3^{2+}$ and 1M in respect of NaOH were introduced into a transparent cell made of the plastic bearing the trade mark LUCITE, the cell dimensions being 2×5×10 cm. Thereafter, the cell was irradiated by means of a slide projector equipped with a 150 W halogen lamp, so as to produce an output of white light with an energy density of 200 W.m$^{-2}$.

At the same time a stream of oxygen gas was bubbled through the cell at a rate of 0.3 liter.min$^{-1}$ and the photochemical reaction was allowed to proceed.

Thereafter, aliquot portions of the reaction mixture were taken at various intervals of time and their H$_2$O$_2$ content was analysed by enzymatic reduction of the peroxide using o-dianisidine, in accordance with the method described by A. G. Fontes, F. F. De La Rosa and C. Gómez-Moreno (Photobiochemistry and Photobiophysics, 1981, 2, pages 355 to 364).

For each sample, the rate of formation of hydrogen peroxide was calculated, and was plotted on a graph. In this way, it was possible to determine, by extrapolation, that the initial rate of formation of $H_2O_2$ was 167 μmol.-liter$^{-1}$.min$^{-1}$.

EXAMPLES 2R TO 5R (not according to the invention)

Example 1, constituting the complete system of oxygen/semicarbazide/Ru(bpy)$_3^{2+}$/light was reproduced, but in each case omitting one of the elements of the system:
Example 2R: the semicarbazide was omitted
Example 3R: the Ru(bpy)$_3^{2+}$ complex was omitted
Example 4R: the light was omitted
Example 5R: the oxygen was omitted.

In Example 5R, a stream of nitrogen gas was bubbled beforehand through the cell so as to obtain a solution free from dissolved oxygen.

The results obtained in respect of the initial rate of formation of $H_2O_2$ were plotted in Table I below.

TABLE I

| Example No. | Component omitted from the system | Rate of formation of $H_2O_2$ μmol.liter$^{-1}$.min$^{-1}$ |
|---|---|---|
| 2R | semicarbazide | <10 |
| 3R | Ru(bpy)$_3^{2+}$ | 20 |
| 4R | light | 38 |
| 5R | oxygen | <10 |

It is thus seen that employing the process according to the invention (complete system of Example 1) makes it possible to achieve initial rates which are of the order of 5 to more than 17 times higher.

EXAMPLES 6R TO 11R (not according to the invention) AND 12 TO 18 (according to the invention)

Example 1 was reproduced, except that in Examples 11R and 12 to 18 the amount of NaOH was adjusted to fix the pH at values of between 9 and 14, in Examples 6R to 9R the addition of NaOH was replaced by a controlled amount of hydrochloric acid so as to fix the pH at values of between 0 and 6, and Example 10R was carried out without addition of NaOH or HCl.

The results obtained in respect of initial rate of formation of $H_2O_2$ are plotted as a graph in FIG. 1, where the ordinate scale expresses the rate of formation of hydrogen peroxide in mmoles.liter$^{-1}$.min$^{-1}$ and the abscissa scale expresses the pH.

The value of selecting, in accordance with the invention, the pH to be within the range of values above 9 can be seen.

EXAMPLE 19 (analysis of the reaction mechanism)

This example was carried out so as to study the photochemical reaction mechanism and in particular the quenching phenomenon of the photoexcited species.

It is based on determination of the spectrum of the excited species and on their kinetics of transient disappearance by means of the laser flash photolysis technique.

To this effect, a ruby laser emitting brief pulses (20 to 30 ns) of about 10 mJ energy at a wavelength of 347 nm was used as the light source. Synchronously with the laser flash, a pulsed Xe lamp produced, over 500 μs, a white light of constant intensity, and was used as the analysis light source for measuring the light transmission of the photochemical system. In this way, the change in transmission over a short interval of time after each laser excitation flash was examined. This change was recorded by means of a memory oscilloscope, the triggering of which was coupled to that of the examination light pulses provided by the Xe lamp. The curves of the transmission at characteristic wavelengths plotted against the time made it possible to calculate the kinetic constants of the quenching reactions of the excited species.

In order to examine the quenching kinetics of the *Ru(bpy)$_3^{2+}$ excited complex, the change in transmission of the reaction mixture (return to colourless) at a wavelength of 452 nm was determined in accordance with this transmission change method. In parallel, measurements of the transient light emission of the reaction mixture were carried out at a wavelength of 610 nm (examination of the decrease in transient emission with time), corresponding to the phenomenon of luminescence of the excited *Ru(bpy)$_3^{2+}$ complex.

To this end, 50M solutions of the Ru(bpy)$_3^{2+}$ complex in water or in a 1M NaOH solution were subjected to the laser flash photolysis technique in the absence or in the presence of a quencher of the excited species *Ru(bpy)$_3^{2+}$. Molecular oxygen (concentration obtained: 1.26 mM) was employed as the quencher. In another test, semicarbazide was used, at a concentration of 20 mM, as the quencher. In this latter case, the absence of oxygen was assured by first bubbling nitrogen gas through the reaction medium for 1 hour.

The results obtained, expressed in the form of 1st order kinetic constants relating to the quenching reaction of the *Ru(bpy)$_3^{2+}$ excited complex were entered into Table II.

TABLE II

| | 1st order kinetic constant for quenching, s$^{-1}$ | |
|---|---|---|
| | Medium | |
| Quencher | Water | 1 M NaOH |
| none | $1.4 \times 10^6$ | $1.6 \times 10^6$ |
| oxygen | $5.7 \times 10^6$ | $5.0 \times 10^6$ |
| semicarbazide | $1.5 \times 10^6$ | $1.8 \times 10^6$ | hvIt appears that the presence of semicarbazide results in kinetic constants of quenching which are virtually the same as those obtained in the absence of a quencher. On the other hand, with oxygen the constant is 3 to 4 times higher than in the absence of a quencher. It is deduced from this that in the simultaneous presence of oxygen and semicarbazide, the quenching of the *Ru(bpy)$_3^{2+}$ excited complex is provided by the oxygen rather than by the semicarbazide.

Furthermore, it also appears that in the case of oxygen, the quenching efficiency is greater in neutral aqueous solution than in alkaline solution.

EXAMPLE 20 (according to the invention)

Example 1 was repeated, substituting Bengal Rose for the Ru(bpy)$_3^{2+}$ complex.

An initial rate of formation of $H_2O_2$ of 733 μmol.-liter$^{-1}$.min$^{-1}$ was thus measured.

EXAMPLE 21 (according to the invention)

A cell similar to that used in Example 1 was employed, with 1 ml of an aqueous solution which was 20 mM in respect of semicarbazide, 0.1 mM in respect of Bengal Rose and 1M in respect of NaOH. Oxygen gas was bubbled through at a rate of 25 ml/min and at the same time the solution was irradiated with monochromatic light at an energy flux of 20 $\mu E.m^{-2}.s^{-1}$ by means of a 150 W Xe lamp and a monochromator, trade mark ORIEL.

Aliquot portions of the mixture were taken during the course of the reaction. The measurements of the initial rate of formation of $H_2O_2$ have been summarized in Table III below, which shows the calculated mean relative production of hydrogen peroxide at 4 wavelength ranges of the visible spectrum, with a value of unity being taken for the spectral range which gave the highest production.

TABLE III

| Wavelengths, nm | Relative production of $H_2O_2$ |
|---|---|
| 460 to 505 | 0.58 |
| 505 to 525 | 0.87 |
| 525 to 548 | 1.00 |
| 548 to 600 | 0.45 |

It appears that the wavelengths corresponding to green light are the most effective.

EXAMPLE 22 (according to the invention)

Oxygen gas was bubbled through 1 ml of an NaOH solution, in a cell similar to that of Example 1, at the rate of 78 ml/min for 10 min. Thereafter, 10 $\mu$l of an aqueous 0.2M semicarbazide solution and a small volume of a Bengal Rose mother liquor were added, while bubbling oxygen through the mixture.

At the same time, the mixture was irradiated with a 150 W Xe lamp equipped with a green filter providing 85% transmission in the wavelength range of 510 to 548 nm, so as to give a photon flux density of 1500 $\mu E.m^{-2}.s^{-1}$.

At regular intervals, aliquot portions of the mixture were taken and the initial rate of formation of hydrogen peroxide was determined.

Figure 2:
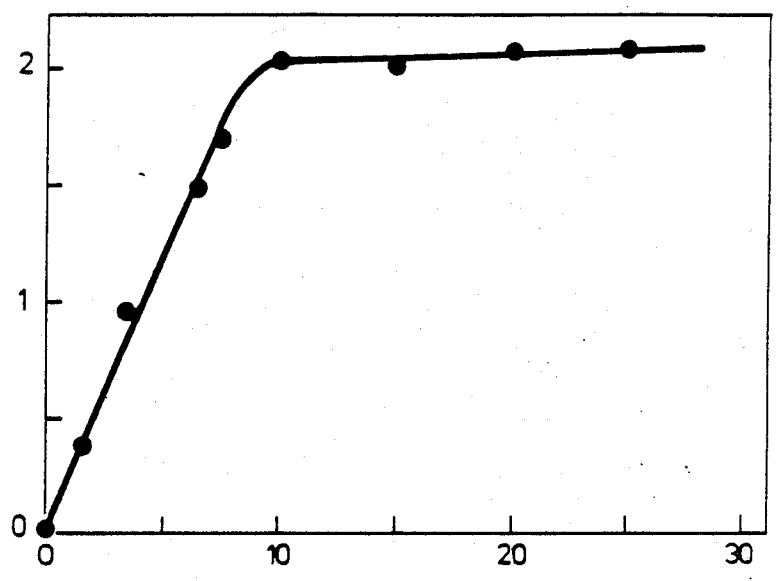
FIG. 2 illustrates the rate of formation of hydrogen peroxide in mmoles. liter$^{-1}$. min$^{-1}$ as a function of Bengal Rose concentration expressed in mmoles/liter.

The results obtained were plotted in the diagram in FIG. 2, in which the abscissa scale represents the Bengal Rose concentration expressed in mmoles/liter and the ordinate scale expresses the rate of formation of hydrogen peroxide in mmoles.liter$^{-1}$.min$^{-1}$. They show the value of fixing the Bengal Rose concentration at a value close to saturation, namely 9 to 10 $\mu$M in the case in question.

EXAMPLE 23 (according to the invention)

Example 22 was reproduced, fixing the Bengal Rose concentration at 8 $\mu$M and the semicarbazide concentration at 20 mM and varying the photon flux densities.

Figure 3:
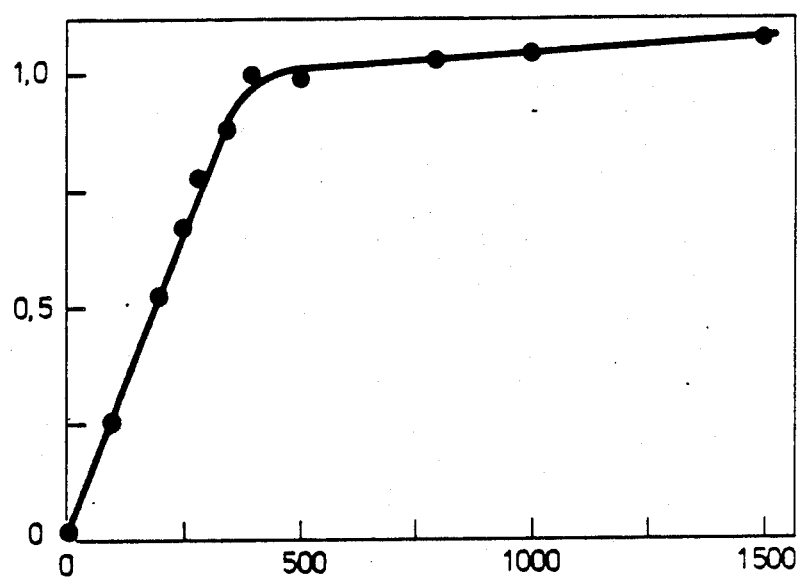
FIG. 3 illustrates the rate of formation of hydrogen peroxide in mmoles. liter$^{-1}$. min$^{-1}$ as a function of photonflux density expressed in $\mu$E.m$^{-2}$.s$^{-1}$.

The results were plotted as a graph in the diagram of FIG. 3 in which the abscissa scale represents the photon flux density expressed in $\mu E.m^{-2}.s^{-1}$ and the ordinate scale represents the rate of formation of hydrogen peroxide in mmoles.liter$^{-1}$.min$^{-1}$.

Here again may be seen the value of employing a value of the photon flux density close to the saturation value, which in this case is about 480 $\mu E.m^{-2}.s^{-1}$.

We claim:

1. A process for the manufacture of hydrogen peroxide, comprising:
photoreduction of molecular oxygen in an aqueous medium at a pH above 9 in the presence of visible light, semicarbazide and a photosensitizer selected from among Bengal Rose and ruthernium II trichelate complex with the ligand (2,2'-dipyridyl) referred to by the abbreviation Ru (bpy)$_3^{2+}$.

2. The process according to claim 1, wherein the pH is fixed at a value between 12 and 14.

3. The process according to claim 1, wherein the pH of the medium is fixed by controlled addition of sodium hydroxide.

4. The process according to claim 1, wherein a stream of oxygen gas is passed through the reaction medium.

5. The process according to claim 1, wherein the rutheniumII tris(2,2'-dipyridyl) complex is immobilized in an ion exchange polymer matrix belonging to the class of the perfluorosulphonates.

6. The process according to claim 1, wherein a Bengal Rose concentration of between 6 and 10 $\mu$moles per liter of reaction medium is employed.

7. The process according to claim 1, wherein in the case where Bengal Rose is used as the photosensitizer the visible light is chosen from among monochromatic or polychromatic light of wavelength between 500 and 550 nm.

8. The process aaccording to claim 1, wherein a light intensity of between 100 and 500 $\mu E.m^{-2}.s^{-1}$ is employed.

* * * * *